(12) United States Patent
Hoffmann et al.

(10) Patent No.: US 11,371,973 B2
(45) Date of Patent: Jun. 28, 2022

(54) TEST DEVICE AND METHOD FOR THE SEMI-QUANTITATIVE DETERMINATION OF CHLORINE DIOXIDE IN A LIQUID SAMPLE CONTAINING FREE CHLORINE

(71) Applicant: AXAGARIUS GmbH & Co. KG, Düren (DE)

(72) Inventors: Jürgen Hoffmann, Düren (DE); Ralph Husmann, Düren (DE); Dominik Lange, Cologne (DE); Tobias Schillberg, Kreuzau (DE)

(73) Assignee: AXAGARIUS GmbH & Co. KG, Düren (DE)

( * ) Notice: Subject to any disclaimer, the term of this patent is extended or adjusted under 35 U.S.C. 154(b) by 215 days.

(21) Appl. No.: 16/931,963

(22) Filed: Jul. 17, 2020

(65) Prior Publication Data

US 2021/0018478 A1 Jan. 21, 2021

(30) Foreign Application Priority Data

Jul. 18, 2019 (DE) .......................... 102019119480.6

(51) Int. Cl.
*G01N 31/22* (2006.01)
*G01N 1/40* (2006.01)
(52) U.S. Cl.
CPC ........... *G01N 31/22* (2013.01); *G01N 1/4044* (2013.01)

(58) Field of Classification Search
CPC ..... G01N 1/4044; G01N 31/22; G01N 31/223
See application file for complete search history.

(56) References Cited

U.S. PATENT DOCUMENTS

| | | | | |
|---|---|---|---|---|
| 5,710,372 | A | * | 1/1998 | Becket ................ G01N 31/221 73/61.41 |
| 5,972,713 | A | | 10/1999 | Kuzuhara et al. |
| 2003/0092189 | A1 | | 5/2003 | Johnson et al. |
| 2008/0206879 | A1 | | 8/2008 | Malone et al. |
| 2020/0049630 | A1 | | 2/2020 | Mali et al. |

FOREIGN PATENT DOCUMENTS

| | | | |
|---|---|---|---|
| CN | 108152288 A | * | 6/2018 |
| DE | 69627770 T2 | | 2/2004 |
| EP | 0762120 A1 | | 3/1997 |

OTHER PUBLICATIONS

Espacenet English translation of CN108152288A. (Year: 2018).*

* cited by examiner

*Primary Examiner* — Jennifer Wecker
*Assistant Examiner* — Kathryn Elizabeth Limbaugh
(74) *Attorney, Agent, or Firm* — Berenato & White, LLC

(57) ABSTRACT

Test device and method for the semi-quantitative determination of chlorine dioxide in a liquid sample has at least two carrier matrices. The first carrier matrix comprises at least one amino acid, sodium thiosulphate, at least one redox indicator, buffer substances and at least one surfactant. The second carrier matrix comprises at least one inorganic iodide salt, starch and/or at least one starch derivative, sodium thiosulfate, buffer substances and at least one surfactant.

17 Claims, 1 Drawing Sheet

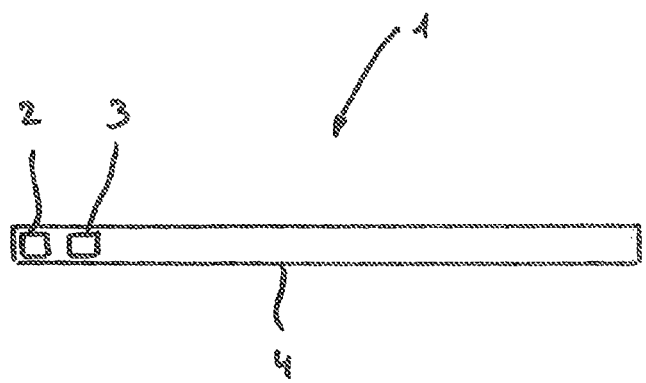

TEST DEVICE AND METHOD FOR THE SEMI-QUANTITATIVE DETERMINATION OF CHLORINE DIOXIDE IN A LIQUID SAMPLE CONTAINING FREE CHLORINE

CROSS-REFERENCE TO RELATED APPLICATIONS AND CLAIM TO PRIORITY

This application relates to application Ser. No. 102019119480.6 filed Jul. 18, 2019 in the Federal Republic of Germany, the disclosure of which is incorporated herein by reference and to which priority is claimed.

FIELD OF THE INVENTION

The present invention relates to a test device for the semi-quantitative determination of chlorine dioxide in a liquid sample. Furthermore, the present invention relates to a method for the semi-quantitative determination of chlorine dioxide in a liquid sample containing free chlorine.

BACKGROUND OF THE INVENTION

Chlorine dioxide is a compound of chlorine and oxygen. It is mainly used for bleaching in the textile, cellulose and paper industry and for disinfection, for example as water disinfectant, as a disinfectant in the food industry or for the disinfection and deodorization of waste, waste water or similar.

When using chlorine dioxide, it must often be ensured that the concentration is within specified limits. For the semi-quantitative determination of chlorine dioxide in a liquid sample, test devices are available, which are for example based on redox indicators and their color reaction. For example, the companies LaMotte, Indigo Instruments and ITS offer test devices in the form of test strips on which a carrier matrix is arranged, which carrier matrix is provided with an indicator reagent. LaMotte offers two products with which chlorine dioxide can be determined semi-quantitatively, on one hand in the measuring range of 0-10 mg/L and on the other hand in the measuring range of 0-500 mg/L. The measuring range of 0-500 mg/L is also covered by test strips from Indigo Instruments. ITS offers test strips for the measuring ranges of 0.1-1.6 mg/L and 0.5-100 mg/L chlorine dioxide.

In an aqueous solution, chlorine dioxide and free chlorine can coexist. As oxidants, both chlorine dioxide and free chlorine influence the color change of a redox indicator, which, however, is not desirable, if only the concentration of chlorine dioxide is to be determined. Against this background, it is desirable to suppress interference in the color change of the redox indicator with respect to other oxidants contained in the liquid sample to be tested, especially with respect to free chlorine.

Based on this state of the art, it is a task of the present invention to provide an alternative test device for the semi-quantitative determination of chlorine dioxide in a liquid sample and an alternative method for the semi-quantitative determination of chlorine dioxide in a liquid sample containing free chlorine.

SUMMARY OF THE INVENTION

To solve this problem, the present invention provides a test device of the type mentioned above, which is characterized in that the test device has at least two carrier matrices, wherein the first carrier matrix comprises at least one amino acid, sodium thiosulphate, at least one redox indicator, buffer substances and at least one surfactant, and wherein the second carrier matrix comprises at least one inorganic iodide salt, starch and/or at least one starch derivative, sodium thiosulfate, buffer substances and at least one surfactant. A substantial advantage associated with the test device according to the invention is that, thanks to the two different carrier matrices, a substantially larger measuring range of chlorine dioxide can be detected than with the commercially available test strips mentioned above. A combination of amino acid, redox indicator and sodium thiosulfate shows a color series that can be differentiated very easily. At the same time, the combination of amino acid and sodium thiosulfate allows interference suppression against 1000 mg/L free chlorine.

According to a variant of the present invention, the amino acid is selected from the group consisting of alanine, glycine, histidine, leucine, isoleucine, lysine, valine and proline, wherein glycine is preferred.

Favorably, the redox indicator is selected from the group consisting of benzidine, o-tolidine, o-dianisidine, 3,3'-5,5'-tetramethylbenzidine and syringaldazine, wherein 3,3'-5,5'-tetramethylbenzidine is preferred. In particular, a combination of glycine as amino acid and 3,3'-5,5'-tetramethylbenzidine as redox indicator, together with sodium thiosulfate, shows a color series from yellow to brown-green that can be differentiated very well. With one variant, the molar ratio between glycine, sodium thiosulfate and 3,3'-5,5'-tetramethylbenzidine is between 36:11:1 and 1:1:1 and preferably between 18:5.5:1 and 1:1:1 and particularly preferably between 15:4.5:1 and 1:1:1 especially, the molar ratio is between 13.2:4:1 and 10.9:3.3:1 and particularly especially at 12:3.6:1.

Preferably, the buffer substances are selected from the group consisting of phosphates, acetates, citrates, tartrates and borates, wherein citrate is preferred.

Favorably the surfactant is selected from the group consisting of fatty alcohol ethoxylates, fatty alcohol propoxylates, alkyl glucosides, alkyl polyglucosides, Octylphenol ethoxylates, sodium lauryl sulfate, ammonium lauryl sulfate, sodium lauryl ether sulfate, sodium myristyl ether sulfate, sodium dioctylsulfosuccinate, dodecylpyridinium chloride and cocamidopropyl betaine, wherein sodium lauryl sulfate is preferred. For the first carrier matrix, according to a variant, the concentration of the impregnating solution is between 10 and 1 mmol/L, preferably between 8 and 2 mmol/L and particularly preferably between 7 and 2.5 mmol/L and especially at 3.1 mmol/L. For the second carrier matrix, according to a variant, the concentration in the impregnating solution is between 10 and 0.2 mmol/L, preferably between 5 and 0.5 mmol/L and particularly preferably between 3 and 1 mmol/L and especially at 1.7 mmol/L.

According to a variant of the present invention, the first carrier matrix comprises an inert dye, in particular tartrazine, neozapon yellow or yellow-orange.

The concentration of the inert dye is in the range of 0.5-2.5 mmol/L, preferably in the range of 1.0-2.0 mmol/L, particularly preferably in the range of 1.0-1.5 mmol/L and especially is 1.24 mmol/L. Such a combination of sodium thiosulfate and an inert dye allows for covering the desired measuring range and for a clear color differentiation.

According to a variant of the present invention, the inorganic iodide salt is selected from the group consisting of lithium iodide, sodium iodide, potassium iodide, rubidium iodide, caesium iodide, magnesium iodide, calcium iodide, strontium iodide and barium iodide, wherein potassium iodide is preferred. In one version, the concentration within the impregnating solution is between 70 and 10 mmol/L, preferably between 60 and 20 mmol/L and particularly preferably between 45 and 30 mmol/L and especially at 38 mmol/L.

Preferably, the starch is selected from the group consisting of potato starch, corn starch, rice starch and wheat starch, wherein potato starch is preferred.

Favorably, the starch/iodide mixture of the second carrier matrix has a weight ratio of 1:1 to 10:1, better even of 2:1 to 5:1, and especially of 2.8:1, and preferably, the concentration of sodium thiosulfate is in the range of 0.3-0.46 mol/L, better even in the range of 0.34-0.44 mol/L, especially in the range of 0.36-0.40 mol/L. By means of a buffer system and such a starch/iodide mixture in combination with sodium thiosulfate as reagent, the reaction rate of the second carrier matrix is adapted to the reaction rate of the first carrier matrix, which allows for a simultaneous reading of both test fields, thus simplifying and improving the manageability of the test device for the end user.

In one variant, the weight ratio between sodium thiosulfate, starch and potassium iodide is between 30:10:1 and 1:1:1 and preferably between 25:6:1 and 1:1:1 and particularly preferably between 20:5:1 and 1:1:1. Especially, the molar ratio herein is between 18:4:1 and 10:2:1 and particularly especially at 15.1:3.1:1.

According to a version of the present invention, the test device is designed as a test strip, wherein the carrier matrices are liquid-absorbent.

In a preferred manner, the carrier matrices are arranged at the end of the test strip and are located spatially separated from but in spatial proximity to each other.

According to a variant of the present invention, the compositions of the carrier matrices are selected such, that the total measuring range is 10-3500 mg/L chlorine dioxide.

Favorably, the compositions of the carrier matrices are selected such that the measuring range 10-2000 mg/L chlorine dioxide is covered by the first carrier matrix and the measuring range 2000-3500 mg/L chlorine dioxide is covered by the second carrier matrix.

Further, for solving the above-mentioned task the present invention creates a method for the semi-quantitative determination of chlorine dioxide in a liquid sample containing free chlorine, comprising:

a) bringing the liquid sample into contact with both carrier matrices of a test device according to any of the preceding claims;
b) comparison of the color of both carrier matrices with a color scale for reading the chlorine dioxide concentration.

BRIEF DESCRIPTION OF THE DRAWINGS

Further features and advantages of the present invention are illustrated by the following description with reference to the enclosed drawing, which schematically shows a test device according to an embodiment of the present invention.

DETAILED DESCRIPTION OF THE PREFERRED EMBODIMENTS

The illustrated test device 1 for the semi-quantitative determination of chlorine dioxide in a liquid sample is designed as a test strip and comprises two liquid-absorbing carrier matrices 2 and 3, which are attached to one end of a strip-shaped carrier 4 that is mainly made of plastic and are located spatially separated from but in spatial proximity to each other. At the other end, a user can grasp the carrier with his fingers to immerse the two carrier matrices 2 and 3 in a liquid sample.

The first carrier matrix 2 covers the measuring range 10-2000 mg/L chlorine dioxide. For producing this carrier matrix, two impregnating solutions were prepared. Therein, the following recipe was used for half a liter of the first impregnation solution:

| | |
|---|---|
| Ethanol | 250 mL |
| Deionized water | 250 mL |
| Glycine | 10 g |
| Sodium thiosulfate-pentahydrate | 10 g |
| Sodium hydroxide | 8.1 g |
| Citrate acid monohydrate | 15.9 g |
| Sodium lauryl sulfate | 0.45 g |
| Tartrazine | 0.33 g |

For impregnation, filter paper was dipped into the first impregnating solution and then dried. For half a liter of the second impregnating solution, the following recipe was used:

| | |
|---|---|
| Ethanol | 500 mL |
| 3,3'-5,5'-tetramethylbenzidine | 2.68 g |

For impregnation, the filter paper impregnated with the first impregnating solution was dipped into the second impregnating solution, following which the filter paper is subsequently dried.

The following Table 1 shows the reaction colors of the first carrier matrix 2:

TABLE 1

| Concentration of chlorinedioxide ($ClO_2$, mg/L) | | | | | | | | |
|---|---|---|---|---|---|---|---|---|
| 0 | 10 | 25 | 50 | 100 | 250 | 500 | 1000 | 2000 |
| Yellow | Light Yellow-Green | Light Green | Green | Light Green-Blue | Blue-Green | Dark Blue-Green | Dark Green | Brown-Green |

Table 2 shows the reaction colors for the first carrier matrix 2 (see entry 3) compared to the reaction colors of other comparative carrier matrices (see entries 1 and 2 and 4 to 8), each of which comprise 3,3'-5,5'-tetramethyl-benzidine (TMB) as a redox indicator in combination with various nitrogen-containing compounds.

TABLE 2

| Entry | Reactive substances | Concentration of chlorine dioxide ($ClO_2$, mg/L) | | | | |
|---|---|---|---|---|---|---|
| | | 0 | 10 | 25 | 50 | 100 |
| 1 | TMB, glycine | Yellow | Light Yellow-Green | Light Green | Green | Light Green-Blue |

TABLE 2-continued

| Entry | | | | | | |
|---|---|---|---|---|---|---|
| 2 | TMB, glycine, phenylsemicarbazide (PSC) | Yellow | Light Yellow-Green | Light Green | Green | Light Green-Blue |
| 3 | TMB, Glycin, sodium thiosulfate | Yellow | Light Yellow-Green | Light Green | Green | Light Green-Blue |
| 4 | TMB, Na-Cyclamate | Yellow | Light Yellow-Green | Light Green | Green | Light Green-Blue |
| 5 | TMB, ammoniu chloride | Yellow | Light Yellow-Green | Light Green | Green | Light Green-Blue |
| 6 | TMB, urea | Yellow | Light Yellow-Green | Light Green | Green | Light Green-Blue |
| 7 | TMB, creatinine | Yellow | Light Yellow-Green | Light Green | Green | Light Green-Blue |
| 8 | TMB, PSC | Yellow | Light Yellow-Green | Light Green | Green | Light Green-Blue |

| | Concentration of chlorine dioxide ($ClO_2$, mg/L) | | | | Chlorine |
|---|---|---|---|---|---|
| Entry | 250 | 500 | 1000 | 2000 | ($Cl_2$) |
| 1 | Blue-Green | Dark Blue-Green | Dark Green | Brown | Light Green (200 mg/L) |
| 2 | Blue-Green | Dark Blue-Green | Dark Green | Brown | Light Green (200 mg/L) |
| 3 | Blue-Green | Dark Blue-Green | Dark Green | Brown-Green | Yellow (1000 mg/L) |
| 4 | Blue-Green | Dark Blue-Green | Dark Green | Brown | Dark-Green (200 mg/L) |
| 5 | Blue-Green | Dark Blue-Green | Dark Green | Brown | Dark-Green (200 mg/L) |
| 6 | Blue-Green | Dark Blue-Green | Dark Green | Brown | Dark-Green (200 mg/L) |
| 7 | Blue-Green | Dark Blue-Green | Dark Green | Brown | Dark-Green (200 mg/L) |
| 8 | Blue-Green | Dark Blue-Green | Dark Green | Brown | Dark-Green (200 mg/L) |

It can be seen that the comparison matrices produce a color reaction of 10-1000 mg/L chlorine dioxide. At higher concentrations, the chromogen is destroyed and the reference matrices are colored brown. Interference suppression against free chlorine is present up to a concentration of <200 mg/L. On the other hand, the carrier matrix 2 with 3,3'-5, 5'-tetramethylbenzidine, glycine and sodium sulfate show a color series of 10-2000 mg/L chlorine dioxide that can be differentiated very well. At the same time, the combination of glycine and sodium sulfate allows for an interference suppression against 1000 mg/L free chlorine. Up to this concentration, the carrier matrix 2 remains yellow.

The second carrier matrix 3 covers the measuring range 2000-3500 mg/L chlorine dioxide. For producing this second carrier matrix, an impregnating solution was prepared. The following recipe was used for half a liter of this impregnating solution:

| | |
|---|---|
| Deionized water | 500 mL |
| Disodium hydrogen phosphate dihydrate | 40 g |
| Potassium dihydrogen phospate | 10 g |
| Starch | 9.75 g |
| Potassium iodite | 3.15 g |
| Sodium thiosulfate pentahydrate | 47.5 g |
| Sodium lauryl sulfate | 0.25 g |

For impregnation, filter paper was dipped into the impregnating solution, after which the filter paper was dried.

Table 3 shows the reaction colors of the second carrier matrix 3 (see entry 6) compared to the reaction colors of other comparative carrier matrices, in which only the sodium thiosulfate concentration was varied (see entries 1 to 5 and 7).

TABLE 3

| | Concentration of sodium thiosulfate (per 20 mL impregnating | Concentration of chlorine dioxide ($ClO_2$, mg/L) | | | |
|---|---|---|---|---|---|
| Entry | solution) | 2000 | 2500 | 3000 | 3500 |
| 1 | 0.9 g | Black | Black | Black | Black |
| 2 | 1.1 g | Black | Black | Black | Black |
| 3 | 1.3 g | Light Brown | Black | Black | Black |
| 4 | 1.5 g | Light Brown | Black | Black | Black |
| 5 | 1.7 g | Light Brown | Black | Black | Black |
| 6 | 1.9 g | Light Brown | Dark Brown | Brown-Black | Black |
| 7 | 2.1 g | White | White | Light Brown | Brown |

The second carrier matrix 3 reacts according to the principle of the potassium iodide/starch reaction in combination with a reducing agent, in this case sodium thiosulfate. The suitable concentration of sodium thiosulfate for achieving a color reaction that can be differentiated well between 2000 and 3500 mg/L chlorine dioxide is 1.9 g/20 ml impregnating solution. Smaller amounts of sodium thiosulfate from 0.9 g-1.7 g/20 ml impregnating solution show a reaction color that is too strong and is poorly differentiable in the desired range of concentration (see entries 1 to 5). Higher concentrations of sodium thiosulfate such as 2.1 g/20 ml impregnating solution (see entry 7) lead to a distinguishability from 2500 mg/L chlorine dioxide. A reaction color is not observed up to 2000 mg/L of free chlorine.

The previously described test device 1 is advantageous in that it has a measuring range of 10-3500 mg/L chlorine dioxide, wherein the measuring range of 10-2000 mg/L chlorine dioxide is covered by the first carrier matrix 2. Simultaneously, a possible interference by free chlorine is effectively prevented up to 1000 mg/L. The measuring range of 2000-3500 mg/L chlorine dioxide is covered by the second carrier matrix 3.

LIST OF REFERENCE SIGNS

1 Testing device
2 Support matrix
3 Support matrix
4 carrier

The invention claimed is:

1. Test device (1) for the semi-quantitative determination of chlorine dioxide in a liquid sample, wherein the test device has at least two carrier matrices (2, 3), wherein the first carrier matrix (2) comprises at least one amino acid, sodium thiosulphate, at least one redox indicator, buffer substances and at least one surfactant, wherein the second carrier matrix (3) comprises at least one inorganic iodide salt, starch and/or at least one starch derivative, sodium thiosulfate, buffer substances and at least one surfactant, and wherein the compositions of the carrier matrices (2, 3) are selected such that the measuring range 10-2000 mg/L chlorine dioxide is covered by the first carrier matrix (2) and the measuring range 2000-3500 mg/L chlorine dioxide is covered by the second carrier matrix (3).

2. The test device (1) according to claim 1, wherein the amino acid is selected from the group consisting of alanine, glycine, histidine, leucine, isoleucine, lysine, valine and proline, wherein glycine is preferred.

3. The test device (1) according to claim 1, wherein the redox indicator is selected from the group consisting of benzidine, o-tolidine, o-dianisidine, 3,3'-5,5'-tetramethylbenzidine and syringaldazine, wherein 3,3'-5,5'-tetramethylbenzidine is preferred.

4. The test device (1) according to claim 1, wherein the buffer substances are selected from the group consisting of phosphates, acetates, citrates, tartrates and borates.

5. The test device (1) according to claim 1, wherein the surfactant is selected from the group consisting of fatty alcohol ethoxylates, fatty alcohol propoxylates, alkyl glucosides, alkyl polyglucosides, octylphenol ethoxylates, sodium lauryl sulfate, ammonium lauryl sulfate, sodium lauryl ether sulfate, sodium myristyl ether sulfate, sodium dioctylsulfosuccinate, dodecylpyridinium chloride and cocamidopropyl betaine, wherein sodium lauryl sulfate is preferred.

6. The test device (1) according to claim 1, wherein the first carrier matrix (2) comprises an inert dye, in particular tartrazine, neozapon yellow or yellow-orange.

7. The test device (1) according to claim 6, wherein the concentration of the inert dye is in the range of 0.5-2.5 mmol/L, preferably in the range of 1.0-2.0 mmol/L, particularly preferably in the range of 1.0-1.5 mmol/L and especially is 1.24 mmol/L.

8. The test device (1) according to claim 1, wherein the inorganic iodide salt is selected from the group consisting of lithium iodide, sodium iodide, potassium iodide, rubidium iodide, caesium iodide, magnesium iodide, calcium iodide, strontium iodide and barium iodide, wherein potassium iodide is preferred.

9. The test device (1) according to claim 1, wherein the starch is selected from the group consisting of potato starch, corn starch, rice starch and wheat starch, wherein potato starch is preferred.

10. The test device (1) according to claim 1, wherein the starch/iodide mixture of the second carrier matrix (3) has a weight ratio of 1:1 to 10:1, preferably of 2:1 to 5:1, in particular of 2.8:1, and that the concentration of sodium thiosulfate is in the range of 0.3-0.46 mol/L, preferably in the range of 0.34-0.44 mol/L, in particular in the range of 0.36-0.40 mol/L.

11. The test device (1) according to claim 1, wherein the test device (1) is designed as a test strip, wherein the carrier matrices (2, 3) are liquid-absorbent.

12. The test device (1) according to claim 11, wherein the carrier matrices (2, 3) are arranged at the end of the test strip and are located spatially separated from but in spatial proximity to each other.

13. The test device (1) according to claim 1, wherein the compositions of the carrier matrices (2, 3) are selected such that the total measuring range is 10-3500 mg/L chlorine dioxide.

14. Method for the semi-quantitative determination of chlorine dioxide in a liquid sample containing free chlorine, comprising:
   a) bringing the liquid sample into contact with both carrier matrices (2, 3) of a test device (1) according to claim 1;
   b) comparison of the colour of both carrier matrices (2, 3) with a colour scale for reading the chlorine dioxide concentration.

15. The test device (1) according to claim 2, wherein the redox indicator is selected from the group consisting of benzidine, o-tolidine, o-dianisidine, 3,3'-5,5'-tetramethylbenzidine and syringaldazine, wherein 3,3'-5,5'-tetramethylbenzidine is preferred.

16. The test device (1) according to claim 2, wherein the buffer substances are selected from the group consisting of phosphates, acetates, citrates, tartrates and borates.

17. The test device (1) according to claim 3, wherein the buffer substances are selected from the group consisting of phosphates, acetates, citrates, tartrates and borates.

* * * * *